Feb. 7, 1967   A. J. PAHNKE ET AL   3,302,394
EXHAUST MANIFOLD REACTOR
Filed Nov. 24, 1965   2 Sheets-Sheet 1

INVENTORS
ALDEN JOHN PAHNKE
DONALD MAURICE SOWARDS
BY *Walter H. Steinbaur Jr.*
ATTORNEY Feb. 7, 1967  A. J. PAHNKE ETAL  3,302,394
EXHAUST MANIFOLD REACTOR Filed Nov. 24, 1965  2 Sheets-Sheet 2

*INVENTORS*
ALDEN JOHN PAHNKE
DONALD MAURICE SOWARDS

BY *Walter F. Kimbaugh*

ATTORNEY

United States Patent Office 3,302,394
Patented Feb. 7, 1967

3,302,394
EXHAUST MANIFOLD REACTOR
Alden John Pahnke, Wilmington, and Donald Maurice Sowards, Claymont, Del., assignors to E. I. du Pont de Nemours and Company, Wilmington, Del., a corporation of Delaware
Filed Nov. 24, 1965, Ser. No. 514,752
8 Claims. (Cl. 60—30)

This application is a continuation-in-part application of Serial No. 337,040, filed January 10, 1964, now abandoned.

This invention is directed to an improved system for the oxidation of automotive exhaust gases. This system includes an oxidation reactor of new and improved design and its operation as the exhaust manifold of an automotive engine in conjunction with auxiliary air introduced into the exhaust ports of the engine. The construction of the reactor, its operation close to the exhaust ports of the engine, and introduction of air into the exhaust ports all combine to maintain exhaust gases at a sufficiently high temperature and in a reactive condition to facilitate oxidation of carbon monoxide, partially oxidized hydrocarbons, and other exhaust gas components which may contribute to atmospheric pollution during the normal operation of an internal combustion engine.

The exhaust gases emitted by automobiles and trucks normally contain significant quantities of carbon monoxide and of hydrocarbons and their partial oxidation products. Considerable effort has been directed toward devising ways and means of eliminating or reducing the amounts of said impurities so produced.

In recent years, the problem of emission of unburned hydrocarbons and oxidation products by automotive vehicles has assumed greater importance with the recognition that these hydrocarbons may contribute significantly to atmospheric pollution in metropolitan areas. An effective and economical device for treating exhaust gases to eliminate or significantly reduce the concentration of hydrocarbons and their partial oxidation products in exhaust gases is, accordingly, highly desirable, as also is elimination of carbon monoxide or reduction in its amount.

The concentrations of carbon monoxide and unburned hydrocarbons in automotive exhaust gases depend upon engine operating conditions and the state of engine adjustments, and can vary over wide ranges. Furthermore, hydrocarbon emission levels vary from one vehicle to another for reasons which can only be defined in very general ways. Carbon monoxide levels range as high as 8% to 10% and hydrocarbon levels as high as 4,000 to 6,000 parts per million under some types of vehicle operation. A normally operating automobile may emit from 200 to 300 parts per million of hydrocarbons and less than 1% carbon monoxide under 50 miles per hour cruise conditions but from 4,000 to 6,000 parts per million of hydrocarbons and 5% carbon monoxide during a deceleration from 50 to 20 miles per hour. A suitable device for reducing emissions should function under both conditions as well as under the entire range of engine operating conditions.

In considering the effectiveness of any exhaust treating device, the goal is to reduce the total quantity of hydrocarbons emitted while the engine is being operated. Thus, emissions during deceleration may not be as important as those during an acceleration since the total weight of exhaust gas emitted during a deceleration is considerably less than that emitted during a typical acceleration. A further consideration in determining the effectiveness of an exhaust treating device is the way a typical driver operates a car or truck. Statistics on the driving habits of typical motorists indicate that the average passenger car trip is less than ten miles in length and involves frequent acceleration, deceleration, and low speed cruise operation. Thus, a suitable exhaust-treating device must quickly achieve effective conversion of hydrocarbons and oxidation of carbon monoxide to be effective during the major part of the driving of an average motorist.

For test purposes, a sequence of vehicle driving conditions has been adopted by the California Motor Vehicle Pollution Control Board which approximates a typical vehicle trip. This sequence involves a series of acceleration, deceleration, idle and cruise modes of operation over a period of approximately 20 minutes. Hydrocarbon and carbon monoxide concentrations determined under each of the various modes of operation are multiplied by selected weighting factors to obtain a final number result which is believed to be related to the amount of carbon monoxide and unburned hydrocarbons emitted into the atmosphere during a typical trip. The vehicle is at ambient conditions at the start of the test. This test procedure is called the Test Procedure for Vehicle Exhaust Emissions or simply the California Cycle Test. It emphasizes transient operation and, in particular, low speed accelerations. A useful exhaust treating device must become effective early in the 20 minute test and must be particularly effective under accelerating conditions.

A practical exhaust treating device for passenger cars should have at least the following five attributes; effectiveness, durability, simplicity, low initial cost, and little, if any, operational expense. None of the exhaust gas treating devices developed in the past have achieved all five of these attributes. Some of them, for instance, have been highly effective in reducing carbon monoxide and hydrocarbon concentrations in exhaust gases after reaching equilibrium temperature conditions but because of their design have required considerable time before reaching these temperature conditions. As evaluated by the driving schedule of the California Cycle Test, such devices would be essentially ineffective under normal passenger car operation conditions.

The second requirement of durability is in keeping with the high standards of passenger car reliability to which motorists are accustomed. An acceptable device must function for a long time with little or no maintenance, and ideally with no replacement of parts or of material associated with the effectiveness of the device. All exhaust gas treating units which depend on the oxidation of carbon monoxide and hydrocarbons for their removal have zones in which an atmosphere of oxidizing gases exists at high temperatures. Furthermore, under some conditions, such as when a backfire occurs, high pressures develop within the device. For strength, therefore, an acceptable device must be constructed in ways which reduce or eliminate damage caused by operation under high temperatures and transient high pressures and heavy construction materials are frequently used. Unfortunately, heavy materials of construction and particularly those with poor thermal properties lead to poor warm-up characteristics and require the introduction of auxiliary energy from the burning of additional fuel or fuel vapors to reach sufficiently high temperatures for effective performance.

The third requirement, simplicity, is important from several standpoints. Ease of fabrication and installation, low maintenance cost, and freedom from malfunction are usually associated with simplicity. Many times, greater complexity affects other functions not related directly to exhaust gas oxidation. For instance, a tortuous flow path may be desirable in some exhaust gas reactor designs, but will increase the back pressure of the system unreasonably.

Low initial cost and low operating cost are also desirable. Some of the devices which have been proposed in the past require increased fuel consumption for satisfactory performance. Other devices require replacement of catalysts or other components at frequent intervals. The ideal device is one which is effective without requiring additional fuel or component replacements.

Devices for reducing the amounts of carbon monoxide and unburned hydrocarbons in automotive engine exhaust gases fall into three general categories:

(A) Catalytic reactors
(B) Direct flame afterburners and
(C) Exhaust manifold air oxidation reactors.

Catalytic reactors depend on catalysts for further oxidation of the combustibles in exhaust gases. Such reactors are usually located in the normal muffler position underneath the car and auxiliary air is usually introduced into the exhaust gas stream just before the entrance to the catalytic reactor. Such catalytic reactors have a number of shortcomings. A large quantity of a relatively expensive catalyst is required for satisfactory conversion. Furthermore, the life of most catalyst is quite short due to repeated exposure to high temperature, and frequent replacement is required. The inability of catalysts to maintain high activity upon repeated exposure to high gas temperature makes the location of catalytic mufflers some distance from the exhaust port almost mandatory. As a consequence, an appreciable portion of the sensible heat of the exhaust gases is dissipated in the exhaust pipe leading to the reactor and long warm-up times result.

Direct flame afterburners depend upon a flame front within the afterburner assembly to oxidize carbon monoxide and hydrocarbons in exhaust gases. In order to establish the temperature and concentration conditions necessary for the existence of a flame front, most direct flame afterburners include a heat exchanger, an ignition system, and a mixer for exhaust gas and auxiliary air as integral parts. In the usual configuration, the exhaust gas passes through (a) a heat exchanger where its temperature is increased; (b) a mixing section where air is mixed with the exhaust gas; (c) a reaction chamber containing a spark plug or a hot wire where a flame is established and oxidation occurs; (d) the heat exchanger mentioned in (a) where heat of reaction is transferred to the incoming exhaust gases, and (e) an exhaust outlet to the atmosphere. A direct flame afterburner can be a very efficient device after reaching an equilibrium operating temperature but is very slow in reaching this effective operating condition. While such afterburners are generally located in the exhaust muffler position, they can be also located in the engine compartment adjacent to the engine. When in the usual muffler location, a loss of sensible heat and a drop in the temperature of the exhaust gas occurs in the exhaust pipe ahead of the afterburner. Even when the afterburner is located near the engine, some heat loss occurs or special precautions are necessary to reduce such heat loss. Also, the heat exchangers and passageways leading to the reaction chamber involve masses of material which must be heated to operating conditions before conversion becomes efficient. For quick warm-up and to maintain a flame in the reaction chamber under all conditions, additional fuel must be introduced either by operating the engine with a rich fuel mixture to increase the carbon monoxide content of the exhaust gas or by providing additional fuel vapors along with auxiliary air. Furthermore, complex control systems on the engine and on the afterburner are required to prevent overheating when equilibrium is reached. In addition to increasing the initial expense of the device, these result in increased maintenance costs.

Exhaust manifold air oxidation reactors represent the simplest form of exhaust emission control devices. Such reactors are based on the principle that a large reduction in the concentration of unburned hydrocarbons and carbon monoxide will occur if the exhaust air is immediately mixed with auxiliary air and maintained at a high temperature for a sufficient length of time. Oxidation in these reactors is considered to take place by a homogeneous reaction mechanism as opposed to the flame-burning mechanism of a direct flame afterburner. Essential features of a successful manifold air oxidation reactor are a sufficiently long residence time for complete reaction, a close coupling of the reaction chamber with the engine, introduction of air into the exhaust stream at or near the exhaust valve, and finally an essentially adiabatic reaction chamber with rapid warm-up characteristics. Reference is made to SAE paper No. 650527 presented at the May 17 to 21, 1965, Mid-Year Meeting in Chicago, Illinois, in regard to the performance and design of exhaust manifold reactors.

It is an object of the present invention to provide a practical and durable automotive exhaust gas oxidation system. It is a further object to provide exhaust manifold reactor means to significantly reduce hydrocarbon and carbon monoxide impurities normally occurring in exhaust gases resulting in the operation of internal combustion engines.

These and other objects of the invention will become apparent from the following description and claims.

More specifically, the present invention is directed to an exhaust gas manifold reactor oxidation system which includes the following essential features:

(1) Auxiliary air is introduced into the exhaust ports of the engine (this auxiliary air may be preheated, but not in a way which will cool the unreacted gas or the reaction system).

(2) An exhaust manifold reaction chamber is attached as closely as practical to several exhaust ports with an entrance from each exhaust port into the chamber.

(3) The reaction chamber is of sufficient size for essentially complete oxidation (preferably approximately twice the displacement of one of the cylinders exhausting into the chamber, but possibly from ¾ to 4 times the displacement).

(4) Surrounding the reaction chamber between its surface and an outer shell from one to many heat reflecting structures (radiation shields) of low heat capacity because of either low mass or low specific heat.

(5) Flow of the reacted gases leaving the chamber between the heat reflecting structures directly to an exit, the major part of the flow being with respect to the reaction chamber:

(a) Parallel to the major axis, (b) Circumferentially around with many small entrances from the reaction chamber into the passageways between the heat reflecting structures to insure flow through essentially all the passageways of the exhaust gas from each cylinder, or (c) Radially or obliquely outward. These essential features take advantage of the following factors which are important in the design of an effective exhaust gas oxidation system which will have fast warm-up. Some of these factors have been unappreciated by earlier designers of exhaust gas reaction systems:

(a) The exhaust gas leaving the manifold reaction chamber contains a large amount of thermal energy which can be used to help compensate for heat losses from the reactor assembly.

(b) Close coupling of the reaction chamber with the engine exhaust ports is required for conservation of the heat present in the unreacted exhaust gases.

(c) Extensive convective heat exchange between gases entering the reactor and gases leaving the reactor is undesirable, since the provision of heat exchange surfaces adds mass to the assembly and thus increases warm-up times. The device also is made more complex.

(d) At the temperature existing in the exhaust manifold reactor, radiative heat transfer from gases to solids and from solids to solids is the predominate heat transfer process.

(e) Heat transfer from the wall of the reaction chamber to an outer casing is therefore predominately by radiation and heat reflecting structures or radiation shields interposed between the wall of the reaction chamber and the outer casing reduces heat losses. Passage of the reacted exhaust gases between these heat reflecting structures also serves to reduce convective heat transfer from the reaction chamber to the outer shell.

(f) Residence time of the exhaust gases in the reactor chamber is important. Ideally, the reaction chamber should be large enough to contain the exhaust gases from each cylinder in turn. Since the quantity of exhaust gas varies with engine operating conditions, a compromise volume must be selected. A reaction volume equal to twice the displacement of one of the cylinders exhausting to a reactor is a reasonable size.

(g) Flow patterns in the reactor are important. Exhaust gases flowing from any one port should be distributed throughout the entire reaction volume and allowed to react before being pushed from the reactor by the next charge. Reactor configurations facilitating this process are desirable.

(h) The use of durable materials of construction of low heat capacity in the surface of the reaction chamber and its insulation is important for long life and quick warm-up. The proposed reactor design makes practical the use of either thin sheets of durable metals or of sheets of refractory material as the outer surface of the reaction chamber and as the heat reflecting surfaces of the insulating structure. Since the major part of the insulating action is performed by the heat reflecting surfaces, the outer shell housing can be made relatively heavy and its further insulation can be of any convenient material or thickness.

Accordingly, the present invention is directed to an exhaust manifold reactor for reducing the concentrations of hydrocarbon and carbon monoxide impurities normally present in exhaust gases from an internal combustion engine, said reactor having means for mounting same on said engine immediately adjacent to and connecting means to at least two exhaust ports of said engine into which auxiliary air is introduced, said reactor having conduit means for passing the resulting gas mixture into passage means between (1) the reaction chamber of said reactor (2) heat reflecting means positioned concentrically around said reaction chamber and (3) housing means positioned concentrically around said heat reflecting means, and outlet means for passing the resulting gas mixture into an exhaust pipe.

Preferred embodiments include:

(A) an exhaust manifold reactor as herein described wherein the mixed gases flow longitudinally parallel to the main axis of said reaction chamber and said heat reflecting means;

(B) an exhaust manifold reactor as herein described wherein the mixed gases flow circumferentially around said reaction chamber and said heat reflecting means;

(C) an exhaust manifold reactor as herein described in which the mixed gases flow radially or obliquely outward from said reaction chamber toward said housing means;

(D) an exhaust manifold reactor as herein described in which said heat reflecting means and the walls of said reaction chamber are composed of or coated with materials catalytic toward reducing the concentration of hydrocarbon and carbon monoxide impurities in said exhaust gases;

(E) an exhaust manifold reactor as herein described in which said reaction chamber and said heat reflecting means are composed of thin-walled sections consisting essentially of crystalline refractory material containing, by analysis, at least 25% $Al_2O_3$ and having a porosity of between about 20% and about 70%, said reactor sections being further characterized by a flexural strength at 1550° C. of at least 130 p.s.i.; and (F) an exhaust manifold reactor wherein said housing means is insulated on its outer surface.

Specific embodiments of the present invention include the following particular arrangements of the manifold exhaust gas reactor, along with the first four essential features listed above and are represented in the drawings of this application.

In the accompanying drawings, FIGURES 1, 2, 3, 4 and 5, represent alternate embodiments of the manifold reactors which may be utilized in practicing this invention.

Referring to FIGURE 1, exhaust gas and auxiliary air flow from the exhaust ports 1 of the engine into the reaction chamber 2 and then exit from the reaction chamber at one or more locations 3 to flow through passages 4 to exit at location 5 into exhaust pipes 6. The assembly includes an outer wall of the reaction chamber 7, an outer shell 8, and one or more heat reflecting members 9. The outer shell 8 may be covered with an insulating layer 10 and an outer casing 11. The wall 7, shell 8, and heat reflecting layers 9 are arranged essentially parallel to each other and are essentially continuous except for the opening required at 1, 3 and 5 for passage of the exhaust gases into and from the central reaction chamber and into the exhaust pipe. Thus, they form parallel paths for direct passage of the exhaust gases from the reaction chamber 2 directly to the exhaust pipe 6.

Figure 1:
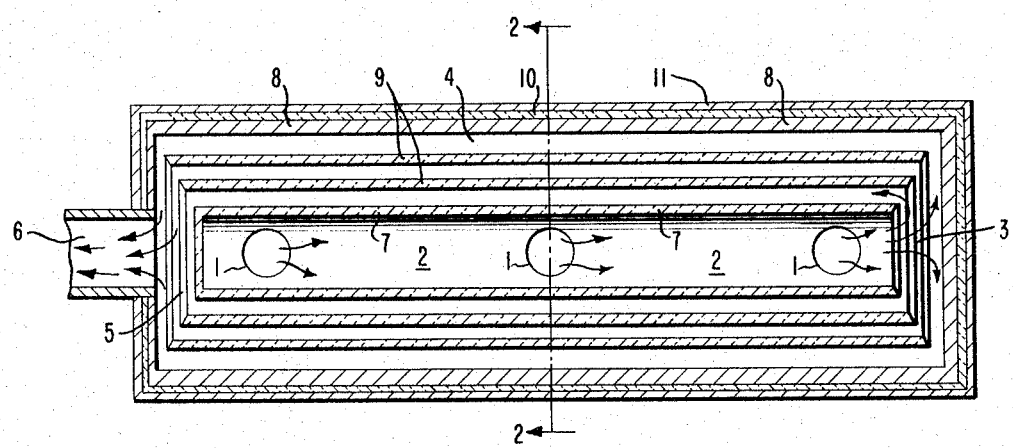
Figure 2:
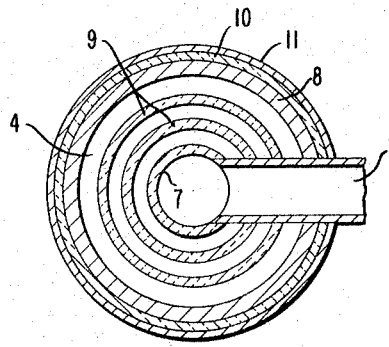
FIGURE 2 represents a sectional view of FIGURE 1 illustrating that the outer wall of the reactor chamber, the heat reflector members and the outer shell are of cylindrical shape. This reactor, of course, could be made in a rectangular, oval or other convenient shape such that the various members are more or less concentric.
Figure 3:
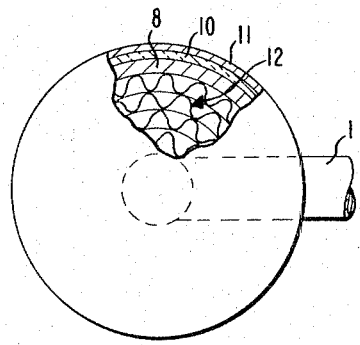
FIGURE 3 is a sectional view of an alternate manifold reactor embodiment of FIGURE 1 wherein the flow of said gases is the same as in FIGURE 2, the difference residing essentially in the flow pattern and the particular heat-reflecting means utilized, said means being ceramic in nature as hereinafter described.
Figure 4:
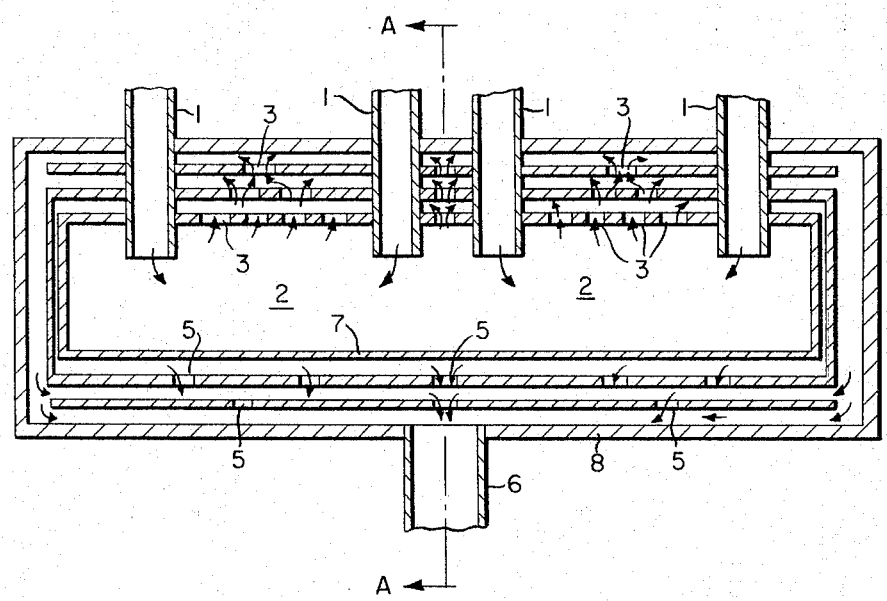
Figure 5:
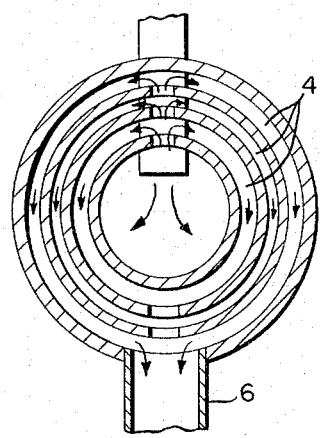

The flow of exhaust gas and the air may be passed circumferentially around the reactor as illustrated in FIGURES 4 and 5. FIGURE 5 is a cross-section of FIGURE 4. Referring to FIGURE 4, exhaust gas and auxiliary air flow from the exhaust port of the engine through the exhaust inlets 1 into the reactor chamber of the reactor 2, exit from the reaction chamber at several locations 3 to flow through passages 4, and exit at location 5 into exhaust pipe 6. The assembly includes an outer wall of the reaction chamber 7, an outer shell 8, and one or more heat reflecting members 9. The outer shell 8 may be covered with an insulating layer and casing as illustrated in FIGURE 1. The reaction chamber wall, heat reflector surfaces, and outer shell are arranged essentially parallel to each other as concentric shells surrounding the length of the reactor and are essentially continuous except for the openings required for passage of the exhaust gases into and out of the reaction chamber and into the common passage. As in the reactor described by FIGURE 1, these shells need not be circular in nature but could be rectangular, oval, or any other convenient shape.

As a further means of practicing this invention, the flow of auxiliary air and manifold exhaust gases may be passed between the heat reflecting surfaces surrounding the reaction chamber of the manifold reactor, said flow of gases being conducted radially or obliquely outward from said reaction chamber by means of the positioning of the heat reflecting structures utilized. In this particular embodiment, the manifold exhaust gases and auxiliary air flow into the manifold reaction chamber from which said gases exit radially or obliquely outward through an appropriate wall assembly heat reflecting means to a surrounding space from which the combusted gases pass through appropriate outlet means.

Features that can be varied within reasonably practical ranges without departing from the spirit of the invention include the following:

Exhaust reactors of the proposed design can include parts made of metals, ceramics, or refractory materials. In some cases the inlet ports and outer casings or housings will be most practically made of metal castings. They can, however, be made of metal sheets. The outer wall of the reaction chamber and the heat reflecting structures can be made of either metal or ceramic or other refractory materials.

A preferred material for the exhaust manifold reactor parts is any of many metal alloys which resist deterioration from the high temperatures and oxidizing atmospheres to which exhaust gas reactives are exposed and also resist changes in shape and strength upon repeated heating and cooling. These alloys can be fabricated by rolling, casting, forging, or other means in sufficiently thin sections to provide the required mechanical strength with low weight. Preferably they are used in sheets from a few to about 100 thousandths of an inch in thickness.

Another preferred material which may be utilized is a crystalline refractory material containing, by analysis, at least 25% of $Al_2O_3$ derived from the in situ oxidation of aluminum. This material can be produced by firing a structure of crimped aluminum foil coated with a flux to obtain an aluminum oxide structure as described in Belgian Patent 612,535. It has excellent thermal shock resistance and strength and can easily be produced in both simple and complex shapes containing thin sheets of relatively small mass. Similar refractory materials can be obtained by firing structures of a fugitive material coated with small particles of aluminum bound together with suitable binders.

The auxiliary air introduced into the exhaust ports of the engine will normally have to be at a pressure somewhat higher than atmospheric pressure to overcome the backpressure of the manifold exhaust reactor and exhaust system. The required pressure can be obtained with any suitable impellor, piston, diaphragm, or vane pump. This pump can conveniently be driven from the engine itself, so that the amount of air delivered will be related to engine speed and therefore to the amount required for complete exhaust gas oxidation. The amount of air required will depend upon many variables well known in the field and can be modified or regulated in any suitable way to be responsive to the position of the accelerator pedal of the car, the intake manifold vacuum of the engine, or any other indicator of the amount of air required.

Auxiliary air can be introduced into the exhaust ports of the engine through holes in these ports, through tubes leading into the ports, through slots or holes in the exhaust valve, or in any other practical way, but it will preferably be introduced near the exhaust valve and into a region in which there is high turbulence in order to obtain efficient mixing with the hot exhaust gases. The auxiliary air can be introduced either continuously or intermittently.

Some increase in the efficiency of exhaust gas oxidation will be obtained if the auxiliary air is preheated without reducing the temperature of the unreacted exhaust gases or the manifold reaction chamber. This can be accomplished with an auxiliary heating device or by heat exchange with the reacted exhaust gases after they pass through the exhaust manifold oxidation reactor. If desired, the auxiliary air can be taken from the crankcase or from any other air space in the engine in which it may have been heated or may have picked up unburned hydrocarbon, blow-by, or other materials which can advantageously be passed through the exhaust gas reactor.

Back pressure in automotive systems is an important parameter affecting fuel performance. As back pressure is increased power developed by the engine is reduced. Furthermore, as back pressure is increased an efficiency loss also takes place due to the fact that no useful work is produced as the exhaust gases pass through the restrictions in the exhaust system.

In the design of the recirculation shielded reactors of this invention, back pressure is an important consideration. It is desired to keep the pressure drop through such a reactor as low as possible. The representative circumferential reactor represents a preferred design from this standpoint for a given volume of recirculation assembly. The cross-sectional area for exhaust gas flow is maximized and the path length is minimized.

For example, comparison of the flow paths of a circumferential recirculation reactor and a longitudinal reactor of comparable size will show that the path length can be reduced 3 or 4 times and the cross-sectional area increased by 2 or 3 times. This would be for the size reactors being considered in the present specification. The performance of the circumferential recirculation reactor for reducing hydrocarbon and carbon monoxide would not be expected to be much different from that for the longitudinal reactor and, therefore, the importance in back pressure performance of the circumferential reactor makes it a preferred embodiment of the present invention.

In addition to net gains in engine performance with reduced average gas pressures, it is possible that instantaneous flow patterns in the exhaust port may also be affected by the pressure drop of a reactor attached directly to the cylinder head. Here again, the circumferential reactor would be expected to be the preferred reactor design.

Any part of the exhaust gas reactor can be coated with catalytic materials, may contain catalytic materials or may be made of suitable catalytic materials. Any of the many exhaust gas oxidation catalysts known to the art may be used. Thus, the reaction chamber may contain pieces of catalytic materials and their carriers if desired, so long as there remains sufficient volume for essentially complete reaction and the catalyst and its carrier do not add unduly to the heat capacity of the system and thereby extend the warm-up time of the reactor. Also, the surface of the reaction chamber and the heat reflecting surfaces between which the exhaust gases pass may be coated with or may carry a catalyst. In this way, additional gas oxidation may be obtained after the normal oxidation reactions have taken place in the reaction chamber and have been significantly effective there. The use of such a catalyst, however, is not required.

A spark plug or hot wire may be installed in a wall of the reaction chamber as a supplementary source of ignition. Such an ignition source can operate either continuously or intermittently.

A by-pass valve can also be installed in the wall of the reaction chamber if desired. This valve can be made responsive to temperature, pressure, or any other property of the exhaust gas mixture, and can be made to open and close by any practical means to control the flow of exhaust gas through the heat conserving structures surrounding the reaction chamber. Other modifications, mechanical in nature, as practically utilized by one skilled in the art, can be incorporated in the practice of this invention.

Other materials suitable for use in the outer wall of the reaction chamber and the heat reflecting structure means include other types of ceramics and refractories which have the desired chemical, thermal and mechanical properties.

The various parts of the exhaust gas reactors can be assembled as is practical by bolting, welding, brazing, cementing, or other suitable techniques. Parts like the outer surface of the reaction chamber and the heat-reflecting structure means can be held in place by spacers and gaskets as necessary and the heat-reflecting structures can be held apart by spacers, dimples, posts, pins, tabs, and other structures as is convenient. A honeycomb form is particularly attractive for the heat-reflecting members when they are made of ceramic refractory materials, since this form provides rigidity and support without providing excessive paths for heat convection and flow between the successive heat-reflecting members. The spacing of the heat-reflecting members can be as little as 1/32 inch when enough passages are present so the total resistance to flow of the exhaust gases is not excessive or as large as is desired, but normally will be less than 1/4 inch.

The effectiveness of manifold reactors in reducing hydrocarbon and carbon monoxide concentrations in exhaust gases was demonstrated by mounting them on an engine on a laboratory dynamometer stand, operating the engine according to recognized test procedures, and measuring the concentrations of hydrocarbons and carbon monoxide in the exhaust gases.

The engine utilized for Examples 1 to 3 was an eight cylinder 1962 Oldsmobile model with a total displacement of 394 cubic inches and a nominal compression ratio of 10.25 and fitted with a four-barrel carburetor. The engine was connected to a 175-horsepower eddy current dynamometer fitted with a flywheel to provide inertia loading during accelerations and decelerations. The dynamometer control circuits were designed so that loads corresponding to the load on a typical passenger car engine at idle, at 30 m.p.h. and at 50 m.p.h., could be applied at any desired time during engine operation. The engine was assembled in the same way as an engine mounted in a car except for the following modifications:

(a) The exhaust gas reactor under the test was installed on the passenger side of the engine, attaching its three ports (the center port handled the exhaust gases from the two interior cylinders) with conventional gaskets. Thus, the exhaust gas reactor handled the gases from four cylinders with a total displacement of 197 cubic inches. The exhaust gases from the four cylinders of the other bank of the engine were piped to the atmosphere. Thermocouples were installed in the central reaction space of the exhaust gas reactor, with the leads passing through the reactor wall.

(b) Exhaust gases passing from the driver's side of the engine through the carburetor cross-over passage were led through an auxiliary pipe to exhaust at atmospheric pressure.

(c) The vacuum advance mechanism was made inoperative at idle. A throttle-actuated solenoid opened to apply atmospheric pressure to the vacuum advance unit when the engine idled.

(d) Thermocouples were installed in the exhaust port passages for determining exhaust gas temperatures.

(e) Air inlets of nominal 0.25 inch steel tubing were passed through the cylinder head and into the exhaust ports. These tubes terminated near the exhaust valves.

(f) Air was supplied to the exhaust gas reactor system through these inlet tubes from a two-cylinder air-cooled piston-type compressor belt driven from a pulley on the drive shaft of the engine. At an engine speed of 1200 r.p.m., corresponding to a car speed of 30 m.p.h., the compressor delivered about 0.25 pound of air per minute or about 18% of the weight flow of the exhaust gases. At an engine speed of 1900 r.p.m., corresponding to 50 m.p.h., the compressor delivered about 0.3 pound per minute or about 12% of the exhaust gas flow. The air from the compressor passed through a ballast tank and a rotameter before being divided for essentially equal flow to each of the four exhaust ports.

The engine was operated through sequences of conditions corresponding to the test cycles specified in the California Motor Vehicle Pollution Control Board's Test Procedure for Vehicle Exhaust Emissions as approved on May 19, 1961, and added to on Februray 1, 1962. Calculations of the weighted composite concentrations of hydrocarbons and carbon monoxide in the exhaust gases were made in accordance with the methods outlined in the procedure. Two test patterns were used in evaluating the performance of the exhaust gas reactors:

*Test Pattern A.*—With the engine and reactor at ambient temperature, the engine was started and carried through the sequences of the California Test for six "warm-up" cycles and one "hot" cycle.

*Test Pattern B.*—Starting immediately after Test Pattern A, addition of auxiliary air through the inlet tubes was stopped and the engine was carried through the sequences of the California Test for three warm-up cycles and one hot cycle. Comparison of analytical results from the hot cycle portions of Test Patterns A and B gave a measure of the reduction in hydrocarbon and carbon monoxide concentrations obtained because of the operation of the manifold reactor.

Representative examples further illustrating the invention follow:

*Example 1*

An all-metal manifold reactor with circumferential flow as illustrated in FIGURES 4 and 5 was constructed of a sheet of TD nickel alloy 10 mils thick and 24 inches wide. The sheet was rolled to provide an internal reaction chamber with a volume of 380 cubic inches, two heat-reflecting members, three parallel passages for gas flow, and an outer shell 5½ inches in diameter, using metal tabs as spacers between the heat-reflecting members. Holes were cut through all the metal sheets of the assembly and inlet pipes were installed to provide passages for exhaust gases into the central reaction chamber. About 40 holes were cut through all but the outer shell in line with the entrance ports to provide a uniform flow of the reacted gases circumferentially around the reaction chamber. Other holes were cut through all but the wall of the reaction chamber to provide an exit for the reacted gases into an exhaust pipe. The ends of the reactor were closed with stainless steel sheets backed by fibrous high-tempearture insulation, and the whole was installed in an outer casing with about ½ inch of fibrous insulation.

Comparisons of this all-metal circumferential manifold reactor with a standard exhaust manifold under Test Pattern A (both with added auxiliary air) are shown in the following table:

|  | Circumferential Reactor | Standard Manifold |
|---|---|---|
| Warm-up cycle: | | |
| Hydrocarbon, p.p.m | 399 | 590 |
| CO, percent | .98 | 1.14 |
| Hot cycle: | | |
| Hydrocarbon, p.p.m | 243 | 502 |
| CO, percent | 1.19 | 1.29 |
| Composite: | | |
| Hydrocarbon, p.p.m | 298 | 542 |
| CO, percent | 1.11 | 1.32 |

*Example 2*

An all-metal reactor of the type shown in FIGURE 1 was assembled by rolling a sheet of Type 304 stainless steel 10 mils thick and 24 inches wide to provide a central reaction volume 4½″ in diameter (volume about 380 cubic inches), three heat-reflecting members, four parallel passages for gas flow, and an outer casing about 5½ inches in diameter. Holes were cut and tubes inserted to provide passages for exhaust gases and auxiliary air into the central reaction chamber; one of the reaction chamber ends was closed with a stainless steel sheet, and the whole was installed with approximately ⅜″ of fibrous insulation inside an outer housing with provision for exhaust of reacted gases throguh the end adjacent to the closed end of the reaction chamber. In this assembly, the reacted exhaust gases flowed longitudinally in parallel paths between the heat-reflecting members around the central reaction chamber.

This all-metal longitudinal reactor was evaluated by Test Pattern A to obtain a weighted composite hydrocarbon concentration of 360 p.p.m. and a weighted composite carbon monoxide concentration of 1.36%. A 60% reduction in weighted composite hydrocarbon concentration was obtained in a comparison of results from the hot cycle portions of this Test Pattern A with the results of the hot cycle of a Test Pattern B carried out at a later time.

*Example 3*

The longitudinal all-metal reactor of Example 2 was mounted on one bank of an Oldsmobile engine. Composite concentrations in Test Pattern A were 339 p.p.m. hydrocarbons and 1.23% carbon monoxide. The reactor was then modified by mounting spark ignitors in front of each of the entrance ports. Test Pattern A was then repeated with continuous spark ignition during all the test modes. Composite concentrations were 370 p.p.m. hydrocarbons and 1.09% carbon monoxide, showing that addition of spark ignitors does not significantly change the effectiveness of the reactor.

A commercially available aluminum honeycomb with 0.125 inch cells made from aluminum alloy 5052 of 0.002" thickness is used as the starting material. Sections 14" x 6" x 1" and 14" x 4" x 1" with the open cells running in the 1 inch dimension, are cut from the honeycomb. The sections are cleaned by immersing in 3 to 5 normal HCl until gas evolution is uniform from the surface, rinsing in water and air drying.

The clean sections are dipped into a dispersion containing one part of aluminum powder (passing a 200 mesh sieve, 98% Al), one part of sodium silicate (40° Bé, $Na_2O:SiO_2$ of 1:3.25) and one part of a 1% aqueous solution of sodium carboxy methyl cellulose, drained and air dried.

The coated honeycomb sections are fired in an air atmosphere according to the following schedule: room temperature to 600° C. (six hours), 600° C. (16 hours), 700° C. (24 hours), 750° C. (six hours), 900° C. (16 hours), 1500° C. (ten hours). The aluminum is completely oxidized to alpha alumina.

*Example 4*

Four pieces of aluminum honeycomb of each size are cut and fitted together to form an open top box 6" x 6" x 22" with an interior cross-section of 4" x 4" and having three openings 1.75" x 1.75", 1.75" x 1.75" and 1.75" x 3.5" (for center port) cut in one side. Three pieces of alumina honeycomb are fitted inside the box at about a 45° angle to the openings. Three pieces of cheesecloth soaked in the aluminum powder composition above are cut to about the size of the side openings and placed exactly opposite the openings on the other side. In a similar manner the two ends of the box are covered completely on the inside. Pieces of the 6" wide alumina honeycomb are placed on top of the box. The entire assembly is cemented with the aluminum powder composition, dried and fired to 1500° C. to provide a unitary structure.

The refractory reactor is mounted in a metal casing (having three entrance ports in one side and one exit port in each end) of inside dimensions about 6.5" x 6.5" x 24" so that an air space of about 0.25" is present between the reactor and the casing.

The complete reactor is mounted on the 1962 Oldsmobile engine and connected to the bank of the four exhaust ports. Using test patterns A and B composite concentrations (for hot and warm-up cycle) of 410 p.p.m. hydrocarbon and 0.95% carbon monoxide are obtained. The percent reduction under test pattern B is 23% hydrocarbon and 33% carbon monoxide. After thirty minutes of operation a sequence of three warm-up cycles and one hot cycle with added air gives a reduction of 35% composite concentration of hydrocarbon for the hot cycle.

*Example 5*

The reactor of Example 5 was installed on one bank of a 1962 Ford V-8 engine with a displacement of 292 cubic inches. The engine was mounted on a test stand and modified in the same manner as the Oldsmobile engine heretofore described. This all-metal longitudinal reactor was operated under test pattern A to obtain a weighted composite hydrocarbon concentration of 75 p.p.m. and weighted carbon monoxide concentration of 1.01%. When this engine was operated under test pattern A but with standard exhaust manifold and no added air, the weighted composite hydrocarbon concentration was 343 p.p.m. and the weighted composite carbon monoxide concentration was 2.07%. Thus, the reactor produced a 78% reduction in hydrocarbon and a 51% reduction in carbon monoxide.

*Example 6*

The reactor of Example 5 was installed on a 1964 Chevrolet engine with a displacement of 327 cubic inches. This engine was also mounted on a laboratory test stand and modified and operated in the same manner as the Oldsmobile engine. When the engine was operated under test pattern A with the all-metal longitudinal reactor the weighted composite hydrocarbon concentration was 54 p.p.m. and the weighted composite carbon monoxide concentration was 0.60%. When the engine was operated with a standard exhaust manifold and no added auxiliary air the weighted composite hydrocarbon concentration was 503 p.p.m. and the weighted composite carbon monoxide concentration was 2.38%. Thus, the reactor reduced the hydrocarbon concentration by 89% and the carbon monoxide concentration by 75%.

*Example 7*

An all-metal manifold reactor with circumferential flow was constructed of three concentric lengths of 65 thousandths-inch-thick stainless steel pipe. The outer shell diameter was 3½ inches and inner core diameter was 2½ inches. One heat reflector surface of three inches diameter was used. Holes were cut through the metal pipes so that the inlets could be installed for the passage of exhaust gases into the central reaction chamber. Holes were also cut as illustrated in FIGURES 4 and 5 so that the exhaust gases could exit from the central reaction chamber and flow circumferentially around the reaction chamber in the passages between the reaction chamber and the heat reflecting member and between the heat reflecting member and the outer shell. The ends of the pipes were closed with parallel plates. The over-all length of the reactor was approximately 19 inches. The reactor was installed on one bank of the Chevrolet engine described in Example 6. When the engine was operated under test pattern A the weighted composite hydrocarbon concentration was 82 p.p.m. and weighted composite carbon monoxide concentration was 0.92%. Thus, this circumferential flow reactor produced an 84% reduction in hydrocarbon and a 61% reduction in carbon monoxide.

It is understood, in the practice of the present invention, as readily comprehended by one skilled in the art, that internal combustion engines of four, six, eight or any number greater than two cylinders can be operated according to the present novel method herein described and claimed. Appropriate back pressure control elements can be incorporated as necessary, it being further observed that the use of the conventional and regular type of muffler is not essential to achieving the novel results described herein. The range of automotive fuels for internal combustion engines is fully operative in the practice of this invention whether said fuels are leaded or unleaded.

The exhaust manifold reactors may be installed on internal combustion engines in any of several ways obvious to those skilled in the art. The major requirement is that all of the exhaust gas from the engine must pass through an exhaust manifold reactor. As an example, on an eight-cylinder engine of V-type construction, it would be convenient to install a reactor on each side of the engine such that each reactor received the exhaust gas and auxiliary air from four exhaust ports. It would also be quite feasible to place the exhaust manifold reactor in the center of the V, such that all eight exhaust ports could be connected directly to the reactor and to use two carburetors and intake systems, on on each side of the V. Similarly, on a V-4 or V-6 or a horizontally opposed 4, 6 or 8 cylinder engine two reactors could be advantageously employed each receiving the exhaust gas from half of the exhaust ports.

For in-line type engines a single exhaust manifold reactor might be employed to receive the exhaust gas from all of the exhaust ports. For various construction reasons, however, two or more exhaust manifold reactors could be attached. For example, on a six-cylinder engine two reactors might be installed, each of which would handle three exhaust ports. Since the exhaust flow is intermittent it is preferred that each reactor receive the exhaust gases from two or more exhaust ports so that the high temperatures in the reaction chamber may be maintained. With these examples in mind there are many other methods of installing one or more reactors on internal combustion engines which would be obvious to those skilled in the art.

The particular means of introducing auxiliary air into the exhaust ports of the engine may vary as desired by a matter of design; the air may be introduced, for example, intermittently and concurrently with the exhaust gases as displaced into the manifold reactor when practicing this invention.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property is claimed are as follows:

1. An exhaust manifold reactor for reducing the concentrations of hydrocarbon and carbon monoxide impurities normally present in exhaust gases from an internal combustion engine, said reactor having means for mounting same on said engine immediately adjacent to and connecting means to at least two exhaust ports of said engine into which auxiliary air is introduced, said reactor having conduit means for passing the resulting gas mixture into passage means between (1) the reaction chamber of said reactor (2) heat reflecting means positioned concentrically around said reaction chamber and (3) housing means positioned concentrically around said heat reflecting means, and outlet means for passing the resulting gas mixture into an exhaust pipe.

2. An exhaust manifold reactor according to claim 1 wherein the mixed gases flow longitudinally parallel to the main axis of said reaction chamber and said heat reflecting means.

3. An exhaust manifold reactor according to claim 1 in which the mixed gases flow circumferentially around said reaction chamber and said heat reflecting means.

4. An exhaust manifold reactor according to claim 1 in which the mixed gases flow radially outward from said reaction chamber toward said housing means.

5. An exhaust manifold reactor according to claim 1 in which said heat reflecting means and the walls of said reaction chamber are composed of materials catalytic toward reducing the concentration of hydrocarbon and carbon monoxide impurities in said exhaust gases.

6. An exhaust manifold reactor according to claim 1 in which said reaction chamber and said heat reflecting means are composed of thin-walled sections consisting essentially of crystalline refractory material containing, by analysis, at least 25% $Al_2O_3$ and having a porosity of between about 20% and about 70%, said reactor sections being further characterized by a flexural strength at 1550° C. of at least 130 p.s.i.

7. An exhaust manifold reactor according to claim 1 wherein said housing means is insulated on its outer surface.

8. An exhaust manifold reactor according to claim 1 in which said heat reflecting means and the walls of said reaction chamber are coated with materials catalytic toward reducing the concentration of hydrocarbon and carbon monoxide impurities in said exhaust gases.

References Cited by the Examiner
UNITED STATES PATENTS 2,263,318  11/1941  Tifft _____ 60—30
3,220,179  11/1965  Bloomfield _____ 60—30

MARK NEWMAN, *Primary Examiner.*

RALPH D. BLAKESLEE, *Examiner.*

Dedication 3,302,394.—*Alden John Pahnke*, Wilmington, and *Donald Maurice Sowards*, Claymont, Del. EXHAUST MANIFOLD REACTOR. Patent dated Feb. 7, 1967. Dedication filed Mar. 24, 1971, by the assignee, *E. I. du Pont de Nemours and Company*.

Hereby dedicates the entire term of said patent to the Public.
[*Official Gazette June 15, 1971.*]